United States Patent [19]

Judge

[11] Patent Number: 4,875,089
[45] Date of Patent: Oct. 17, 1989

[54] MULTI-STANDARD VECTORSCOPE

[75] Inventor: John L. Judge, Hillsboro, Oreg.

[73] Assignee: Magni Systems, Inc., Beaverton, Oreg.

[21] Appl. No.: 328,741

[22] Filed: Mar. 22, 1989

Related U.S. Application Data

[63] Continuation of Ser. No. 204,647, Jun. 9, 1988, abandoned.

[51] Int. Cl.$^4$ .................... H04N 17/02; H04N 11/20
[52] U.S. Cl. ......................................... 358/10; 358/11
[58] Field of Search .................... 358/10, 11, 139, 140

[56] References Cited

U.S. PATENT DOCUMENTS

| | | | |
|---|---|---|---|
| 2,751,429 | 6/1956 | Schlesinger | 358/10 |
| 3,230,304 | 1/1966 | Schönfelder | 358/10 |
| 3,384,706 | 5/1968 | Davidse | 358/11 |
| 3,449,510 | 6/1969 | Steinkopf | 358/11 X |
| 3,517,116 | 6/1970 | Remick | 358/11 |
| 3,614,304 | 10/1971 | Schonfelder | 358/10 |
| 3,646,254 | 2/1972 | Illetschko et al. | 358/10 |
| 3,820,156 | 6/1974 | Schulz | 358/10 |
| 4,092,666 | 5/1978 | Rhodes et al. | 358/10 |
| 4,096,514 | 6/1978 | Scholz | 358/11 |
| 4,204,220 | 5/1980 | Rutishauser | 358/11 X |
| 4,283,738 | 8/1981 | Rutishauser | 358/11 |
| 4,488,168 | 12/1984 | Mino | 358/10 |
| 4,573,086 | 2/1986 | Sakai et al. | 358/11 |
| 4,792,845 | 12/1988 | Judge | 358/10 |

FOREIGN PATENT DOCUMENTS

| | | | |
|---|---|---|---|
| 58-36074 | 3/1983 | Japan | 358/10 |
| 58-141092 | 8/1983 | Japan | 358/11 |
| 2126832 | 3/1984 | United Kingdom | 358/11 |

OTHER PUBLICATIONS

Merlin, Snell, and Wilcox publication of MVW 200 and MSD 140 Multiscopes, Sep. 1988.
Tekronix 650 Series Picture Monitor, 1970.

Primary Examiner—Tommy P. Chin
Attorney, Agent, or Firm—Flehr, Hohbach, Test, Albritton & Herbert

[57] ABSTRACT

A multistandard vectorscope providing vector displays of two or more composite video standards in a single vectorscope. The present invention utilizes a DC controlled phase shifter and a demodulator that are not frequency sensitive along with a switchable oscillator for switching between multiple video standards.

6 Claims, 5 Drawing Sheets

BASIC ELEMENTS OF A DUAL STANDARD VECTORSCOPE

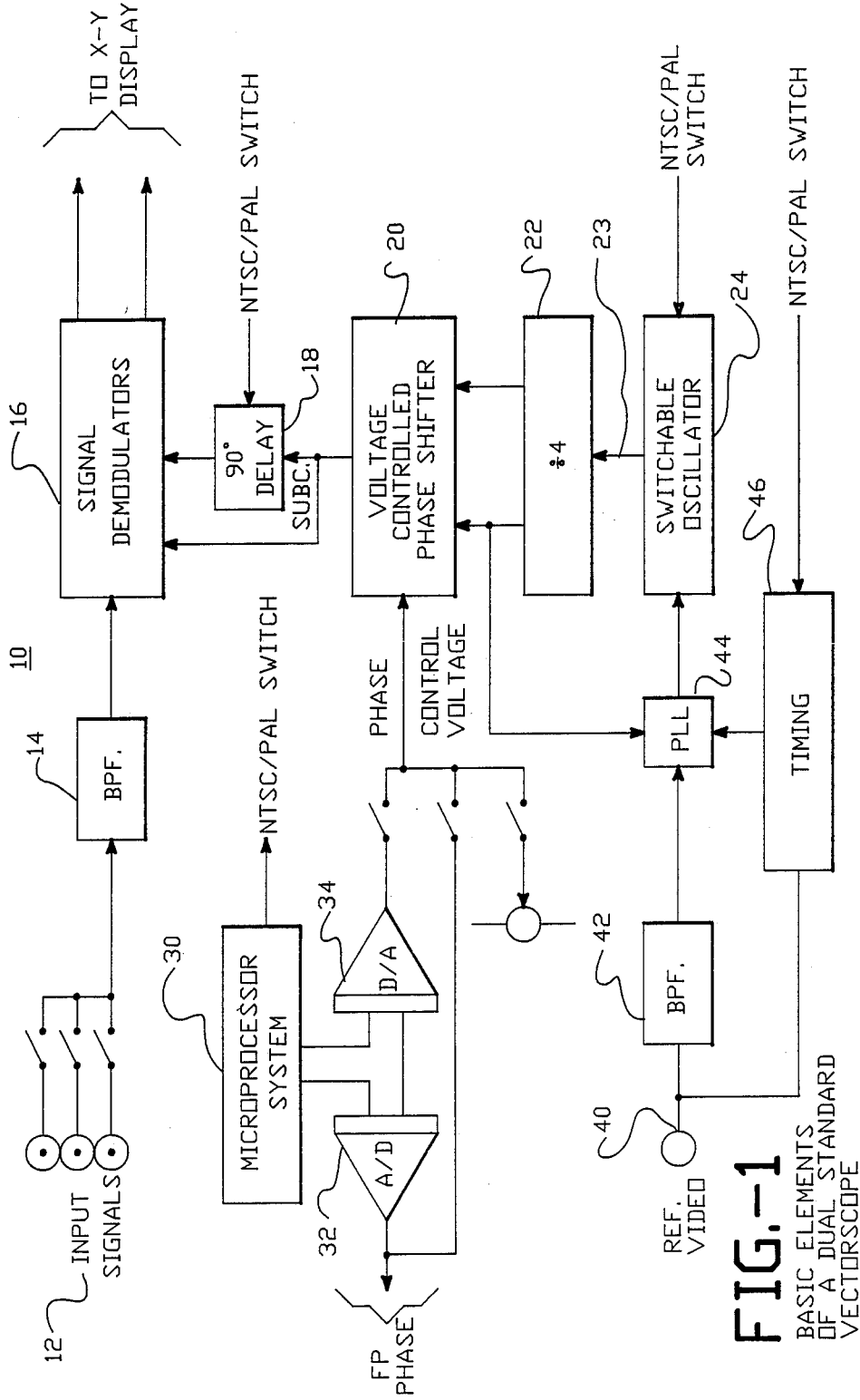
FIG.-1 BASIC ELEMENTS OF A DUAL STANDARD VECTORSCOPE

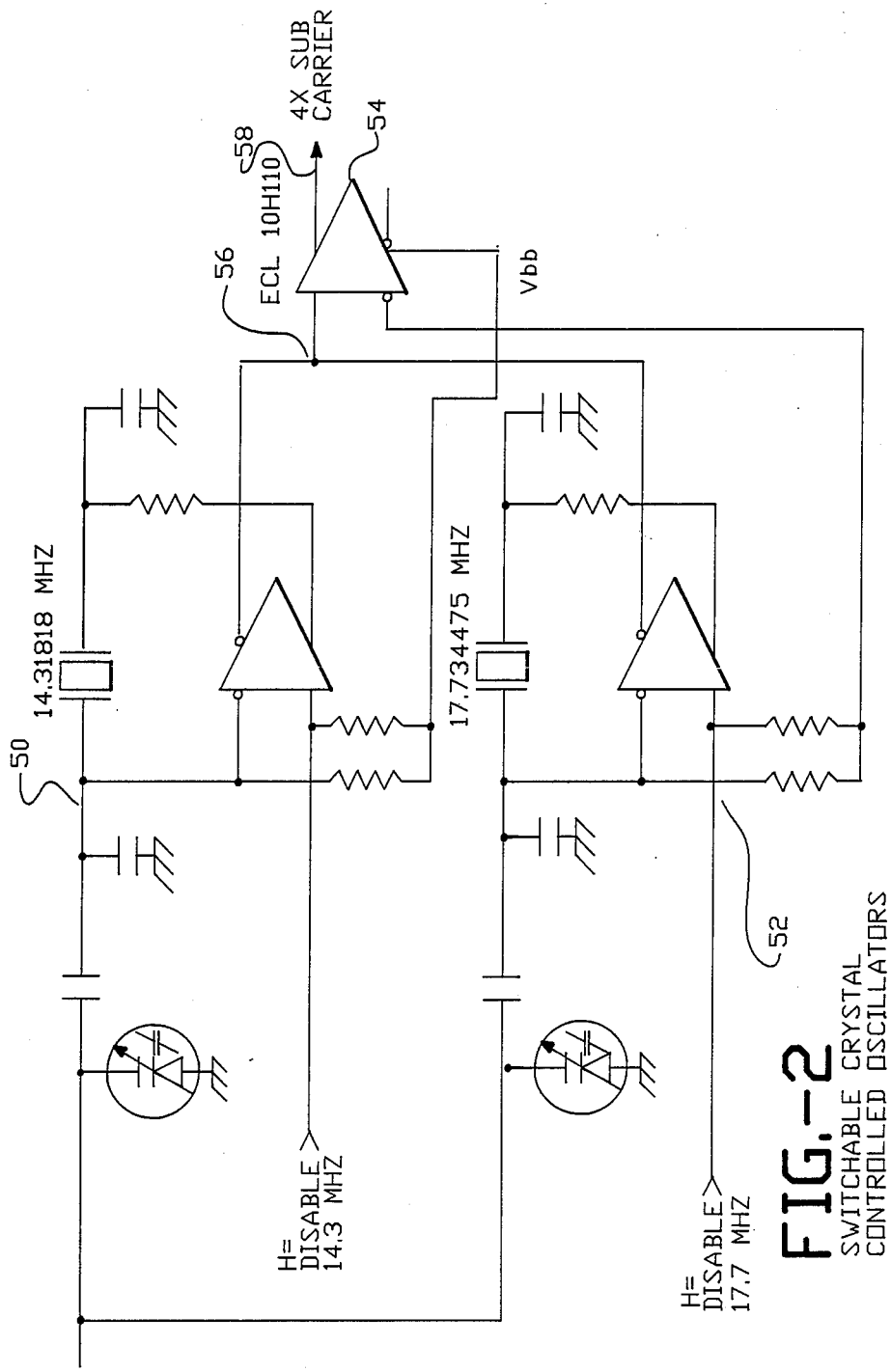
FIG.-2 SWITCHABLE CRYSTAL CONTROLLED OSCILLATORS

DC CONTROLLED VARIABLE PHASE SHIFTER

VARIABLE DC CONTROL VOLTAGE GENERATOR

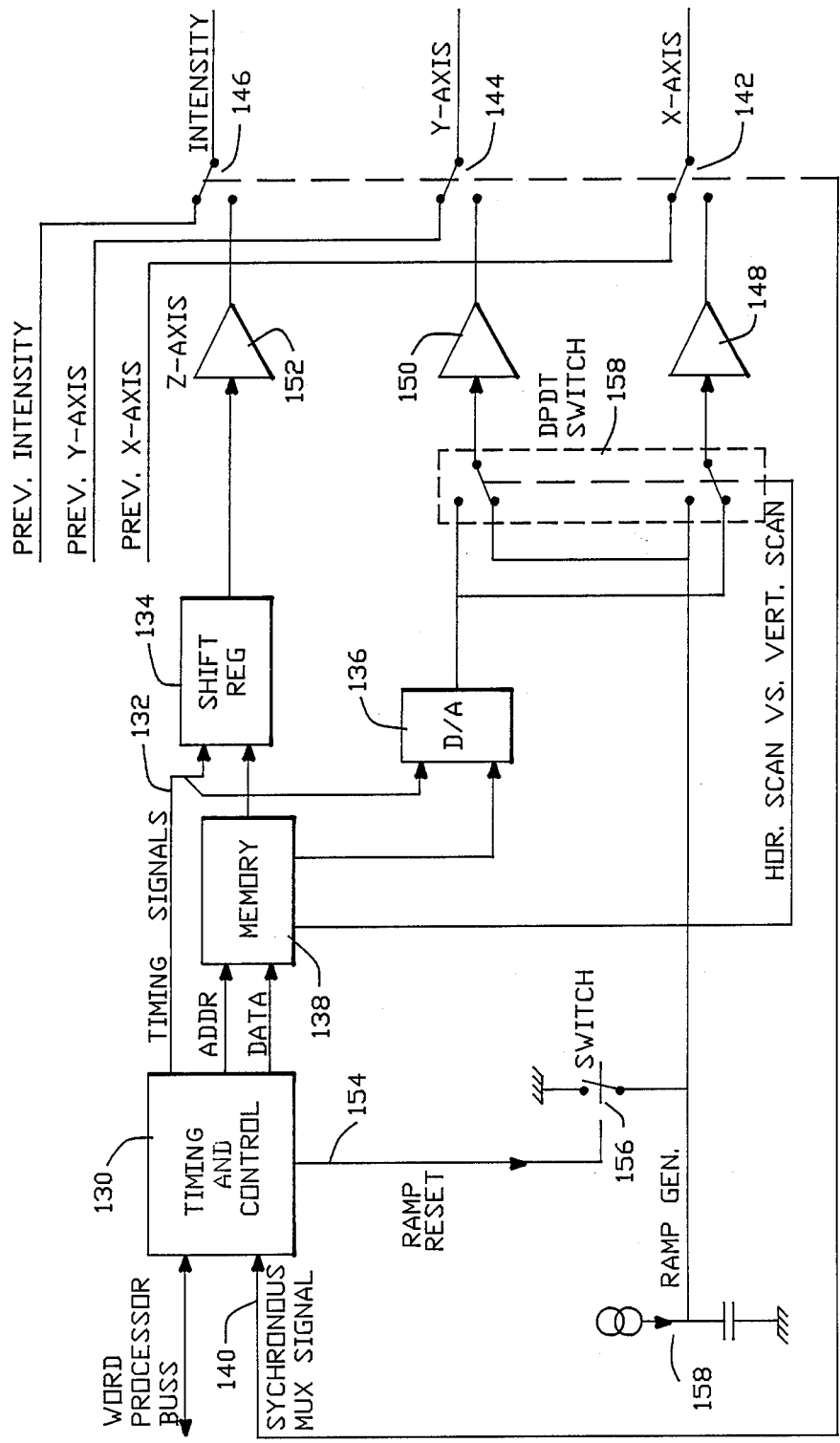
FIG.—5

MULTI-STANDARD VECTORSCOPE

This is a continuation of application Ser. No. 204,647 filed June 9, 1988, now abandoned.

BACKGROUND OF THE INVENTION

The present invention relates to a multi-standard vectorscope for composite video signals. In particular, the present invention is for working with standard PAL and NTSC video signals.

The PAL (Phase Alternation Line) standard pertains to a color television system in which the V component of subcarrier derived from a color burst is inverted in phase from one line to the next in order to minimize hue errors that may occur in color transmission.

The NTSC (National Television System Committee) standard is a standard which was named after an all-industry engineering group which developed U.S. color television specifications. The NTSC standard now describes the American system of color telecasting.

There are three PAL and one NTSC standards with different subcarrier frequencies. In the prior art, two or more different pieces of equipment are required to monitor PAL and NTSC color information, each of which includes a separate oscillator. It has not been practical in the past to combine the different pieces of equipment due to potential crosstalk of the oscillators and the lack of stable DC controlled phase shifter and demodulator that are not frequency sensitive.

SUMMARY OF THE INVENTION

It is an object of the present invention to provide a multi-standard vectorscope for composite video signals which provides the capability of monitoring both PAL and NTSC color information with different color subcarrier frequencies.

Briefly, the multi-standard vectorscope comprises demodulator means for receiving first and second video signals, each of which represent different video standard color information, such as the NTSC and PAL color information.

The vectorscope also includes switchable oscillator means connected to the demodulator means for generating first and second oscillator signals corresponding to the first and second video color information signals, respectively.

The vectorscope further includes control means for switching between the first and second oscillator signals, depending on whether the demodulator means receives the first or second video signals. The demodulator means is responsive to the respective pair of first and second signals to demodulate the first or second video signals with the respective first or second oscillator signals, again depending upon which of the first or second video signals is received by the demodulator means.

Other objects, features and advantages of the present invention will become apparent from the following detailed description when taken in conjunction with the accompanying drawings.

BRIEF DESCRIPTION OF THE DRAWINGS

FIG. 1 depicts a block diagram of the multi-standard vectorscope according to the present invention.

FIG. 2 depicts a diagram of a switchable crystal control oscillator utilized in the present invention of FIG. 1.

DETAILED DESCRIPTION OF THE DRAWINGS

Figure 3B:
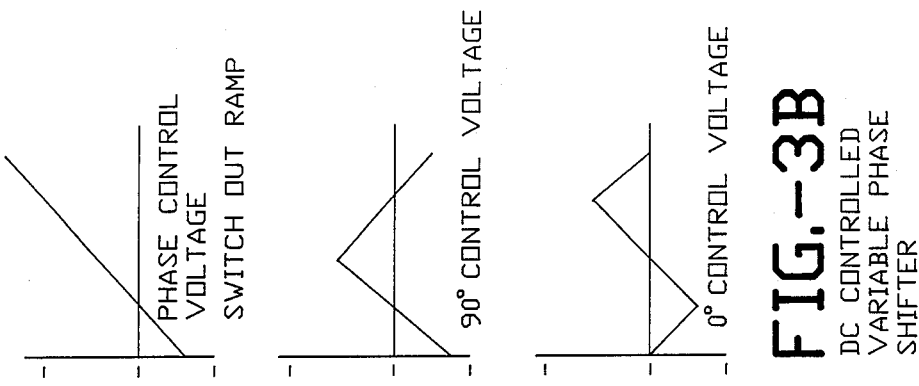
FIG. 3B depicts diagrams of the types of control voltages utilized by the circuit of FIG. 3A.

The present invention makes possible a multi-standard vectorscope for composite video signals by embodying the following techniques (in a preferred embodiment, a dual standard vectorscope). The present invention includes separate oscillators for each of the video standards and means for enabling only one oscillator to operate at a time, thus eliminating cross-talk between one another.

The present invention also includes a DC controlled phase shifter circuit which is independent to the subcarrier frequencies of the video standards. Therefore, it is adaptable for either system or a switchable system which utilizes any of the NTSC or PAL standards.

The present invention also allows input signals, either synchronous or non-synchronous, or mis-timed by delays, to be displayed as if they had been perfectly timed.

Referring now to FIG. 1, a block diagram of a multi-standard vectorscope 10 according to the present invention is depicted. Input signals 12 are input through a bandpass filter (BPF) 14 to signal demodulators 16.

The outputs of signal demodulators 16 are to a conventional X-Y display monitor.

Signal demodulators 16 also receive a 90 degree delay signal from delay circuit 18 and a subcarrier signal from voltage controlled phase shifter circuit 20.

A microprocessor system 30 provides appropriate control through A/D circuits 32 and D/A 34. The milti-standard vectorscope 10 of FIG. 1 includes a switchable oscillator 24 which is connected to receive a reference video signal 40 (corresponding to the PAL or NTSC standard) through bandpass filter 42 to phase lock loop (PLL) circuit 44. Appropriate timing signals are provided to PLL 44 through timing circuit 46.

The switchable oscillator circuit 24 provides as an output on lead 23 suitable oscillator signals depending on the NTSC or PAL type of color information to be utilized. In a preferred embodiment, switchable oscillator 24 generates four times the subcarrier frequency for each standard, the output of which is divided down by divider circuit 22.

The output of divider circuit 22 is input to voltage control phase shifter 20 and also the PLL circuit 44.

The multi-standard vectorscope of FIG. 1 provides the following functions:

1. Subcarrier related frequency switching to follow the input video standard.
2. A DC controlled phase shift network, that is not frequency sensitive, to accommodate the different video standards along with presettable phase for each standard.
3. A switchable, or non-frequency sensitive, delay circuit for the 90 degree phase shifter.
4. A timing circuit to reflect the line and field rates for each standard.

The present invention implements the above functional aspects to work between two or more different television standards.

Referring now to FIG. 2, the switchable crystal controlled oscillators which form a part of the switchable oscillator 24 of FIG. 1 are depicted. In FIG. 2, the crystal controlled oscillators 50, 52 provide first and second oscillator signals respectively, four times the subcarrier frequency for each standard. Each oscillator 50, 52, each of which operates in a linear mode, are connected to an ECL device 54. The outputs of oscillator 50, 52 are wire-or'd at 56. By logically controlling the input of each oscillator 50, 52, only one oscillator will be enabled at a time, thus generating the appropriate oscillator signal at 58. This technique eliminates crosstalk between the oscillators 50, 52, since only one is operational at a time and improves stability over one oscillator that is pulled over the full range between the subcarrier frequencies.

Figure 3A:
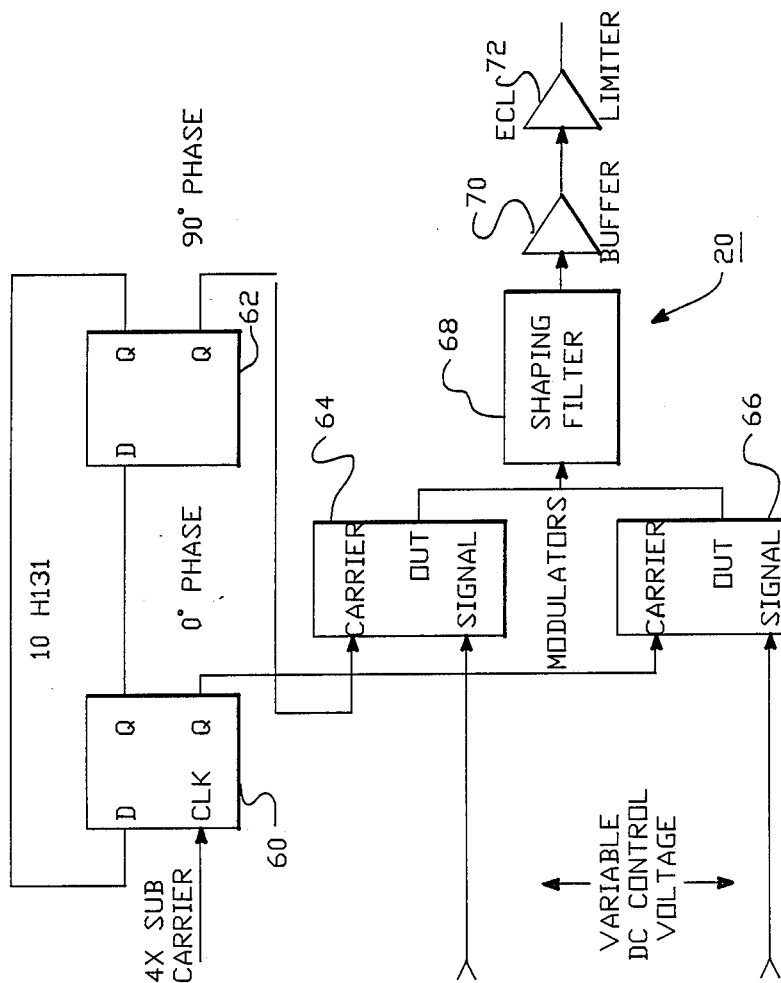
FIG. 3A depicts a block diagram of a DC controllable variable phase shifter.

FIGS. 3A and 3B depict the operation of the controlled variable phase shifter circuit 20 of FIG. 1 which is independent to the subcarrier frequency of each standard. One technique according to the present invention employs a 4X subcarrier frequency oscillator in which the frequency is divided by four through a frequency divider circuit 22, as depicted in FIG. 1.

It is important to start with a 4X subcarrier frequency, so that the frequency divider circuit provides in-phase and a 90 degree phase shifted subcarrier output which is independent of the incoming frequency. The respective outputs from latches 62, 60 of FIG. 3A are input to modulators 64, 66, where the other inputs are controlled by variable DC voltages.

The outputs of the two modulators 64, 66 are summed and shaped by filter circuit 68, which retains the subcarrier frequency, but the phase is controlled by the variable DC voltages. The subcarrier is then buffered in buffer 70 and applied to a limiter circuit 72.

The variable DC control voltages depicted in FIG. 3B can be in the form of DC, a ramp, a triangular wave or any continuous function, which can be generated by any standard means. FIG. 3B shows the phase control voltage as a ramp voltage simulating all allowable phase control inputs and corresponding output voltages for controlling the variable phase shifter through a 360 degree phase shift.

Figure 4:
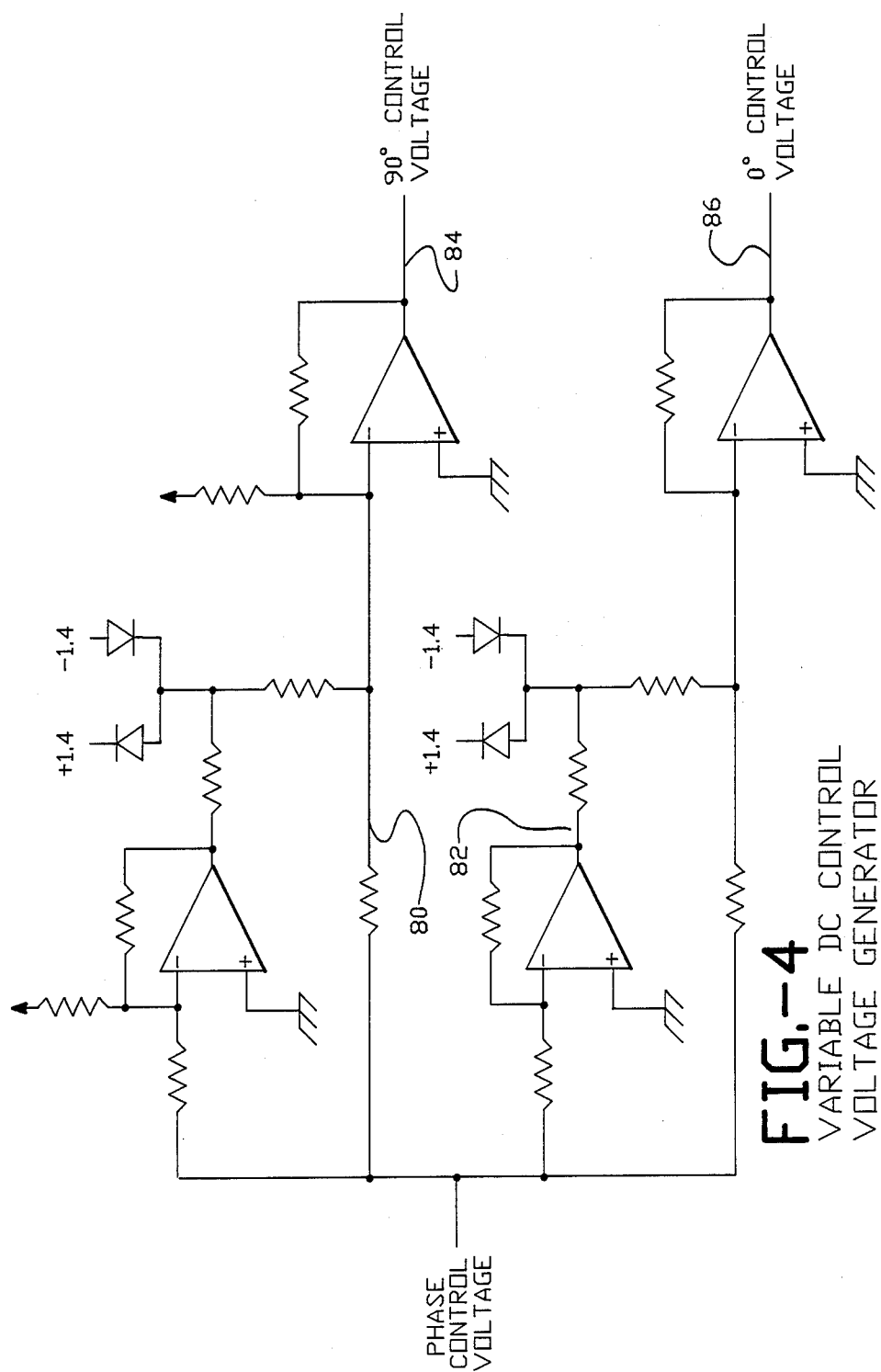
FIG. 4 depicts a diagram of a variable DC control voltage generator utilized by the circuit of FIG. 3.

FIG. 4 depicts a variable DC control voltage generator for generating the variable DC control voltages.

The phase control voltage to the variable DC phase control voltage generator is either internally set, front panel operator controlled, or from a digital to analog converter (DAC) 34 which is programmed by the microprocessor 30 of FIG. 1.

An equipment operator can command the microprocessor 30 to read the front panel phase control through an analog to digital converter (ADC) 32 of FIG. 1 and store that information in its permanent memory for later recall.

The input video signals can then be displayed and controlled by the stored information, in synchronism such that the resulting output display would appear to have both signals of the same phase. This enables viewing signals with different delays by presetting the displayed phase to compensate for internal or external delays. The switching between different DC control voltages allows the display of non-timed inputs as if they were timed inputs.

The 90 degree delay circuit 18 for the demodulator is, in one embodiment, provided by a switching capacitance network, acting as a low-pass delay filter. The timing circuits can be implemented with known techniques.

In the phase shifter 20 of FIG. 1, an analog multiplier may be substituted as a modulator. The variable DC control voltage generator can be provided by two DACs under the control of the microprocessor where all continuous functions and repetitive time variance waveforms can be synthesized. This technique will also establish a monotonic relationship between phase shift and control voltage.

What is claimed is:

1. A multi-standard vectorscope comprising
   demodulator means for receiving input video signals,
   switchable oscillator means connected to said demodulator means for generating at least first and second oscillator signals, said oscillator means connected to receive first and second standard color information signals which correspond to said first and second oscillator signals, respectively,
   control means for switching between said first and second oscillator signals depending upon whether said oscillator means receives said first or second standard signals,
   said demodulator means responsive to said first or second oscillator signals to demodulate said input video signals.

2. A vectorscope as in claim 1 including phase shift network means to accommodate said first and second standard signals.

3. A vectorscope as in claim 2 including a DC controlled phase shifter that is not frequency sensitive, allowing a 360 degree phase shift of the display of any video standard.

4. A vectorscope as in claim 3 including divider means for dividing said first or second oscillator signals to a subcarrier frequency corresponding to said first or second standard signals, respectively.

5. A vectorscope as in claim 4 including means for applying a variable DC control signal to said phase shift means.

6. A vectorscope as in claim 5 including means for switching between different DC control voltages to allow display of non-timed inputs as if they were timed inputs.

* * * * *